UNITED STATES PATENT OFFICE.

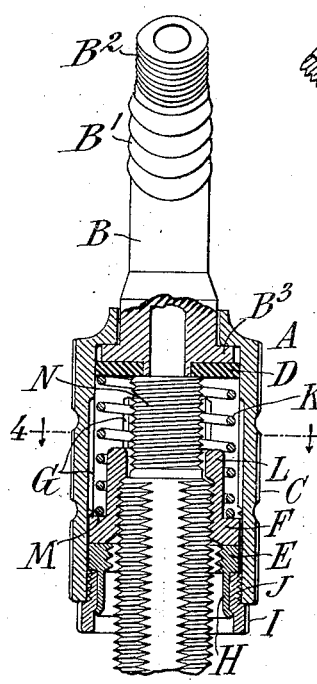
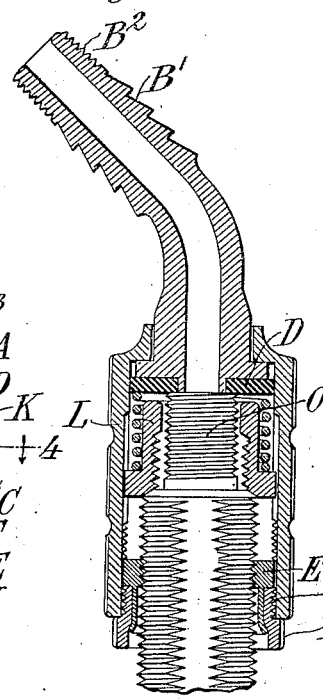
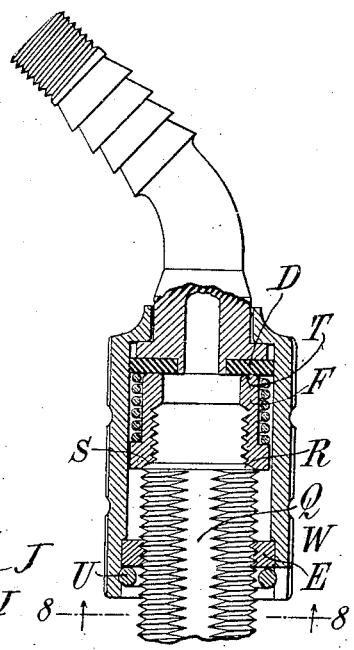
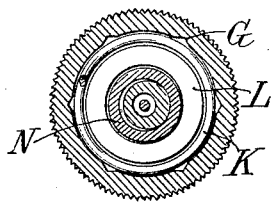
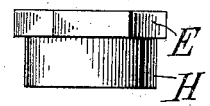
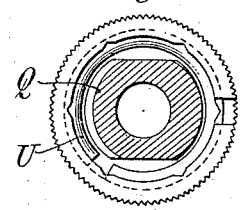
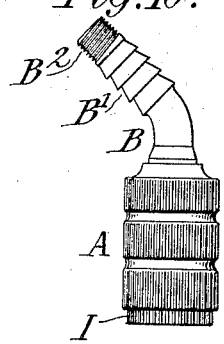
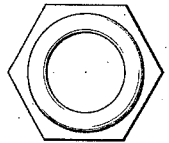
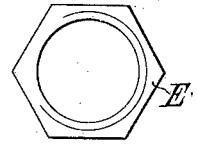

HENRY P. KRAFT, OF RIDGEWOOD, NEW JERSEY.

DOUBLE PUMP CONNECTION.

1,383,127.  Specification of Letters Patent.  Patented June 28, 1921.

Application filed March 29, 1920. Serial No. 369,589.

*To all whom it may concern:*

Be it known that I, HENRY P. KRAFT, a citizen of the United States of America, residing in Ridgewood, in the county of Bergen and State of New Jersey, have invented certain new and useful Improvements in Double Pump Connections, of which the following is a specification.

This invention relates to pump couplings for pneumatic tire valves or the like, and aims to provide certain improvements therein.

The present standard Schrader automobile valve is made principally in two sizes, known in the trade as No. 777 and No. 725. Of these, No. 777 has a valve body of less diameter than that of No. 725, the nipples, however, being of the same external and internal diameter. In most pump couplings as hitherto constructed, the coupling has been designed to screw on the nipple, it being for this reason a matter of indifference as to whether the valve body itself is of larger or smaller diameter. A third type of valve has been proposed for large truck tires in which valve the nipple is omitted, the external diameter of the body, however, conforming to that of the standard No. 725 valve. The principal object of the present invention is to provide a pump coupling which will engage the body threads (as distinguished from the nipple thread) of all three types of valve and make a tight joint with the valve shell. In the preferred form of the present invention, means are provided for making a tight joint with the tops of the nipples of No. 777 and No. 725 valves, and with the top of the body portion of the before-mentioned truck valve.

The invention also includes other features of improvement which will be hereinafter more fully described.

Referring to the drawings which illustrate several modifications of the invention,—

Figure 1 is a view principally in diametrical section of the improved coupling, showing the latter as applied to a No. 777 valve, or a valve of small diameter.

Fig. 2 is a similar view showing the coupling as applied to a No. 725 valve.

Fig. 3 is a similar view of a small modified construction showing the coupling as applied to a truck tire valve.

Fig. 4 is a cross-section on the line 4—4 in Fig. 1.

Fig. 5 is an elevation of the upper nut of Fig. 1.

Fig. 6 is an under side view of Fig. 5.

Fig. 7 is an elevation of the lower nut.

Fig. 8 is a cross-section on the line 8—8 in Fig. 3.

Fig. 9 is a view of the lower nut in Fig. 3.

Fig. 10 is an elevation on a smaller scale of the complete coupling of Fig. 1.

Referring to the drawings, let A indicate the coupling as a whole which is usually formed with a shank B and body portion C. Preferably the shank B is formed with the usual ribs B', and I also prefer to form it with an initial screw-thread $B^2$, by means of which an ordinary coupling can be connected to the coupling of this invention without requiring that the hose be stripped from the ordinary coupling and the shank B inserted therein. The body portion C is best made to swivel on the shank B, and for this purpose the shank B is provided with a flange $B^3$ over which the end of the body portion is turned. A packing washer D is provided, which is carried by the shank B, its upper surface bearing against the flange $B^3$.

According to this invention, I provide the body portion C with two nuts, preferably arranged internally, one being of larger diameter than the other and the nut of smaller diameter being arranged above the larger. In Figs. 1 and 2, the larger nut is indicated by the reference letter E and the smaller nut by the reference letter F. Both of these nuts are non-rotatively held in the body portion and are preferably removable therefrom. The lower nut E may be stationary, but the upper nut F is capable of a sliding or reciprocating movement in the body portion C.

In an application filed simultaneously herewith I have shown a construction of coupling which contains the elements thus far described. That form of coupling was designed to be applied to valves Nos. 777 and 725, and in addition, to a large-sized or truck tire valve, which however, in that instance, was provided with an enlarged nipple. According to the present invention the coupling is adapted to be applied to the first two types of valve, but in the case of the truck tire valve it is designed to be used in connection with a construction which has no nipple.

In constructing the present invention I form a non-rotative connection between the two nuts and the body of the coupling, and in the case wherein the nuts are removable, I prefer to run drifts G along the inner surface of the body portion C, as shown in Figs. 1 and 4. These drifts are adapted to receive the corners of the nuts, which may be hexagonal as shown, the inner nut being designed to slide along the drifts and the outer or lower nut being held in place in its lower position. In the construction of Fig. 1, the lower nut E is provided with a flange H which swivels it to a screw-threaded coupling member I adapted to screw on threads J formed at the lower end of the body of the coupling. This not only holds the nut E in place, but prevents the nut F from falling out of the coupling. The nut F is preferably urged to its bottom position by a spring K, which is shown as surrounding the extension L of the nut and bearing against a face M formed thereon.

The upper nut F is adapted to engage the threads on the body portion of the smaller type of valve, the coupling being screwed over the valve and the valve entering the coupling until its nipple N engages the packing D. In this operation the lower face of the nut F bears against the upper face of the nut E. The application of the coupling to this valve is shown in Fig. 1.

When the coupling is to be applied to a No. 725 valve, the lower nut E engages the exterior threads on the body portion of the valve and the nipple O extends upwardly, as in Fig. 1, and makes a tight joint with the packing D. In this construction the exterior diameter of the valve is sufficiently large to engage the lower nut and press it upwardly against its spring. This, however, is an idle movement designed to displace the nut sufficiently to enable the nipple O to contact with the packing. Fig. 2 shows the parts in these positions.

In Fig. 3 I have illustrated the application of the coupling to a truck tire valve Q. In this construction a tapered face R is preferably formed on the tire valve, which face is adapted to contact with a similar face S on the nut F. The nut F, however, does not function as a nut when used as a truck tire valve but as a sleeve, the upper edge T of which is pressed against the packing washer D. As the coupling is screwed down, therefore, there is a tight joint made between the nut F and the packing and also a tight joint made between the valve casing and the nut by reason of the tapered or other closely fitting surfaces R and S.

Fig. 3 also illustrates the preferred method of holding the nuts in place within the body portion C. This comprises a split ring U adapted to enter a shallow circular recess formed on the interior of the body portion, which ring can be easily removed and replaced. This holds the internal parts in place against dropping out. Immediately above the nut E, I prefer to form a shoulder W which holds the nut E against inward movement.

It will be understood that a packing ring may be interposed between the two nuts for the purpose of engaging the upper edge of the truck tire valve, either in addition to or in lieu of the tapered faces S and R.

While I have shown and described several embodiments of the invention, it will be understood that I do not wish to be limited thereto, since various changes may be made therein without departing from the spirit of the invention.

What I claim is:—

1. A coupling having two nuts of different internal diameters, the larger of said nuts being arranged below and the smaller of said nuts being arranged above, the smaller nut being adapted to be pressed against the upper part of the coupling when the larger nut is engaging a valve.

2. A coupling having two nuts of different internal diameters, the larger of said nuts being arranged below and the smaller of said nuts being arranged above, the smaller nut being adapted to be pressed against the upper part of the coupling when the larger nut is engaging a valve, and a packing engaging the smaller nut when in the last-named position.

3. A coupling having two nuts of different internal diameters, the larger nut being substantially fixed and the smaller nut being slidable within the body of the coupling, a spring for normally holding said smaller nut in its lowermost position, and a packing engaged by the smaller nut when in its uppermost position.

4. A coupling having two nuts of different internal diameters, the larger nut being substantially fixed and the smaller nut being slidable within the body of the coupling, a spring for normally holding said smaller nut in its lowermost position, and a packing engaged by the smaller nut when in its uppermost position, and said nuts being removable from the coupling body.

5. A coupling having a body portion and two nuts, one smaller than the other and arranged above the larger, a non-rotative connection between the exterior of said nuts and the coupling body, a slidable connection for the smaller nut, a spring for normally pressing it downwardly, an extension on the smaller nut, and a packing against which said extension presses when the smaller nut is pushed upwardly by the entering tire valve.

6. A coupling having two nuts, one of which is of larger internal diameter than the other, the smaller nut being adapted to engage valves of small cross-section, and the larger nut being adapted to engage valves of larger cross-section, and a seating face at the lower end of the smaller nut against which a valve shell may press to make a tight joint.

7. A coupling having two nuts, one of which is of larger internal diameter than the other, the smaller nut being adapted to engage valves of small cross-section, and the larger nut being adapted to engage valves of larger cross-section, and a seating face at the lower end of the smaller nut against which a valve shell may press to make a tight joint, said seating face being beveled.

8. A coupling having two internally housed nuts, and a ring engaging the coupling body and overlying one of the nuts for the purpose of maintaining the nuts within the body portion.

In witness whereof, I have hereunto signed my name.

HENRY P. KRAFT.